US012215593B1

(12) United States Patent
Thomas et al.

(10) Patent No.: US 12,215,593 B1
(45) Date of Patent: Feb. 4, 2025

(54) TURBINE SHROUD ASSEMBLY WITH INTER-SEGMENT DAMPING

(71) Applicant: Rolls-Royce Corporation, Indianapolis, IN (US)

(72) Inventors: David J. Thomas, Indianapolis, IN (US); Aaron D. Sippel, Indianapolis, IN (US); Ted J. Freeman, Indianapolis, IN (US); Clark J. Snyder, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 0 days.

(21) Appl. No.: 18/678,892

(22) Filed: May 30, 2024

(51) Int. Cl.
*F01D 25/28* (2006.01)
*F01D 5/22* (2006.01)
*F01D 11/00* (2006.01)

(52) U.S. Cl.
CPC ............ *F01D 25/28* (2013.01); *F01D 5/225* (2013.01); *F01D 11/005* (2013.01); *F05D 2240/11* (2013.01); *F05D 2240/55* (2013.01)

(58) Field of Classification Search
CPC ........ F01D 25/28; F01D 5/225; F01D 11/005; F05D 2240/11; F05D 2240/55
See application file for complete search history.

(56) References Cited

U.S. PATENT DOCUMENTS

| | | | |
|---|---|---|---|
| 7,207,771 | B2 | 4/2007 | Synnott et al. |
| 7,217,089 | B2 | 5/2007 | Durocher et al. |
| 7,374,395 | B2 | 5/2008 | Durocher et al. |
| 7,513,740 | B1 | 4/2009 | Hervy et al. |
| 7,600,967 | B2 | 10/2009 | Pezzetti, Jr. et al. |
| 7,771,159 | B2 | 8/2010 | Johnson et al. |
| 7,901,186 | B2 | 3/2011 | Cornett et al. |
| 8,206,087 | B2 | 6/2012 | Campbell et al. |
| 8,303,245 | B2 | 11/2012 | Foster et al. |
| 8,641,371 | B2 | 2/2014 | Nakamura et al. |
| 8,651,497 | B2 | 2/2014 | Tholen et al. |
| 8,684,680 | B2 | 4/2014 | Martin et al. |
| 8,784,041 | B2 | 7/2014 | Durocher et al. |
| 8,845,285 | B2 | 9/2014 | Weber et al. |
| 8,905,708 | B2 | 12/2014 | Weber et al. |
| 9,079,245 | B2 | 7/2015 | Durocher et al. |
| 9,534,500 | B2 | 1/2017 | Bouchard et al. |
| 9,708,922 | B1 | 7/2017 | Davis et al. |
| 9,714,580 | B2 | 7/2017 | Slavens et al. |
| 9,745,854 | B2 | 8/2017 | Baldiga et al. |
| 9,759,079 | B2 | 9/2017 | Sippel et al. |

(Continued)

FOREIGN PATENT DOCUMENTS

| | | | |
|---|---|---|---|
| EP | 1965031 | A2 | 9/2008 |
| EP | 3543468 | A1 | 9/2019 |
| FR | 3056636 | A1 | 3/2018 |

*Primary Examiner* — Eldon T Brockman
(74) *Attorney, Agent, or Firm* — Barnes & Thornburg LLP

(57) ABSTRACT

A turbine shroud assembly includes a first shroud segment, a second shroud segment, and a seal assembly. The first shroud segment includes a first carrier segment arranged circumferentially at least partway around a central axis and a first blade track segment supported by the first carrier segment. The second shroud segment is arranged circumferentially adjacent the first shroud segment about the central axis. The seal assembly is configured to block gases from escaping the gas path radially between the first shroud segment and the second shroud segment.

20 Claims, 7 Drawing Sheets

(56) References Cited

U.S. PATENT DOCUMENTS

| | | | |
|---|---|---|---|
| 9,863,265 | B2 | 1/2018 | Stapleton |
| 9,863,323 | B2 | 1/2018 | Kirtley et al. |
| 9,869,201 | B2 | 1/2018 | Dyson et al. |
| 9,874,104 | B2 | 1/2018 | Shapiro |
| 9,915,162 | B2 | 3/2018 | Duguay |
| 9,945,256 | B2 * | 4/2018 | Freeman ............... F01D 25/246 |
| 9,945,484 | B2 | 4/2018 | Moehrle et al. |
| 9,957,827 | B2 | 5/2018 | Davis et al. |
| 9,982,550 | B2 | 5/2018 | Davis |
| 9,988,919 | B2 | 6/2018 | Davis et al. |
| 9,988,923 | B2 | 6/2018 | Snyder et al. |
| 10,012,099 | B2 | 7/2018 | Cetel et al. |
| 10,024,193 | B2 | 7/2018 | Shapiro |
| 10,072,517 | B2 | 9/2018 | Boeke et al. |
| 10,082,085 | B2 | 9/2018 | Thomas et al. |
| 10,087,771 | B2 | 10/2018 | Mcgarrah |
| 10,100,660 | B2 * | 10/2018 | Sippel ..................... F01D 11/08 |
| 10,132,197 | B2 | 11/2018 | Heitman et al. |
| 10,138,747 | B2 | 11/2018 | Dev et al. |
| 10,138,750 | B2 | 11/2018 | Mccaffrey et al. |
| 10,167,957 | B2 | 1/2019 | Davis et al. |
| 10,202,863 | B2 | 2/2019 | Davis et al. |
| 10,265,806 | B2 | 4/2019 | Cui et al. |
| 10,281,045 | B2 | 5/2019 | Sippel et al. |
| 10,301,955 | B2 | 5/2019 | Vetters et al. |
| 10,301,960 | B2 | 5/2019 | Stapleton et al. |
| 10,329,930 | B2 * | 6/2019 | Roussille .............. F01D 25/246 |
| 10,378,385 | B2 | 8/2019 | Tesson et al. |
| 10,378,386 | B2 | 8/2019 | Roussille et al. |
| 10,415,426 | B2 | 9/2019 | Quennehen et al. |
| 10,415,427 | B2 | 9/2019 | Quennehen et al. |
| 10,422,241 | B2 | 9/2019 | Mccaffrey et al. |
| 10,428,688 | B2 | 10/2019 | Quennehen et al. |
| 10,428,953 | B2 | 10/2019 | Lutjen et al. |
| 10,443,419 | B2 | 10/2019 | Thomas et al. |
| 10,443,420 | B2 | 10/2019 | Sippel et al. |
| 10,465,545 | B2 | 11/2019 | Cetel et al. |
| 10,533,446 | B2 | 1/2020 | Barak et al. |
| 10,550,706 | B2 | 2/2020 | Lutjen et al. |
| 10,577,963 | B2 | 3/2020 | Mccaffrey |
| 10,577,977 | B2 * | 3/2020 | Baucco ................. F01D 11/005 |
| 10,584,605 | B2 | 3/2020 | Sippel et al. |
| 10,590,803 | B2 | 3/2020 | Quennehen et al. |
| 10,598,045 | B2 | 3/2020 | Tableau et al. |
| 10,605,120 | B2 | 3/2020 | Quennehen et al. |
| 10,619,517 | B2 | 4/2020 | Quennehen et al. |
| 10,626,745 | B2 | 4/2020 | Roussille et al. |
| 10,633,994 | B2 | 4/2020 | Barker |
| 10,648,362 | B2 | 5/2020 | Groves, II et al. |
| 10,655,495 | B2 | 5/2020 | Groves, II et al. |
| 10,655,501 | B2 | 5/2020 | Lepretre et al. |
| 10,662,794 | B2 | 5/2020 | Das |
| 10,689,998 | B2 | 6/2020 | Stapleton et al. |
| 10,690,007 | B2 | 6/2020 | Quennehen et al. |
| 10,704,404 | B2 | 7/2020 | Shi et al. |
| 10,718,226 | B2 | 7/2020 | Vetters et al. |
| 10,724,399 | B2 | 7/2020 | Carlin et al. |
| 10,731,494 | B2 | 8/2020 | Dev et al. |
| 10,731,509 | B2 | 8/2020 | Correia et al. |
| 10,738,643 | B2 | 8/2020 | Mccaffrey et al. |
| 10,753,221 | B2 | 8/2020 | Barker et al. |
| 10,787,924 | B2 | 9/2020 | Quennehen et al. |
| 10,794,204 | B2 | 10/2020 | Fitzpatrick et al. |
| 10,801,345 | B2 | 10/2020 | Clum et al. |
| 10,801,349 | B2 | 10/2020 | Mccaffrey |
| 10,815,807 | B2 | 10/2020 | Vantassel et al. |
| 10,815,810 | B2 | 10/2020 | Barker et al. |
| 10,830,357 | B2 | 11/2020 | Mccaffrey et al. |
| 10,890,079 | B2 | 1/2021 | Propheter-Hinckley et al. |
| 10,907,487 | B2 | 2/2021 | Zurmehly et al. |
| 10,907,501 | B2 | 2/2021 | Filippi et al. |
| 10,934,872 | B2 | 3/2021 | Tableau et al. |
| 10,934,873 | B2 | 3/2021 | Sarawate et al. |
| 10,968,761 | B2 | 4/2021 | Barker et al. |
| 10,968,777 | B2 | 4/2021 | Propheter-Hinckley et al. |
| 10,982,559 | B2 | 4/2021 | Filippi |
| 11,002,144 | B2 | 5/2021 | Azad et al. |
| 11,015,613 | B2 | 5/2021 | Kerns et al. |
| 11,021,988 | B2 | 6/2021 | Tableau et al. |
| 11,021,990 | B2 | 6/2021 | Filippi |
| 11,028,720 | B2 | 6/2021 | Tableau et al. |
| 11,041,399 | B2 | 6/2021 | Lutjen et al. |
| 11,047,245 | B2 | 6/2021 | Mccaffrey |
| 11,066,947 | B2 | 7/2021 | Sippel et al. |
| 11,073,045 | B2 | 7/2021 | Sippel et al. |
| 11,078,804 | B2 | 8/2021 | Tableau et al. |
| 11,085,316 | B2 | 8/2021 | Barker et al. |
| 11,085,317 | B2 | 8/2021 | Johnson et al. |
| 11,105,215 | B2 | 8/2021 | Roy Thill et al. |
| 11,111,794 | B2 | 9/2021 | Bitzko et al. |
| 11,111,802 | B2 | 9/2021 | Propheter-Hinckley et al. |
| 11,111,822 | B2 | 9/2021 | Tableau et al. |
| 11,111,823 | B2 | 9/2021 | Jarrossay et al. |
| 11,125,096 | B2 | 9/2021 | Clark et al. |
| 11,125,098 | B2 | 9/2021 | Barker et al. |
| 11,143,050 | B2 | 10/2021 | Roy Thill et al. |
| 11,149,574 | B2 | 10/2021 | Laroche |
| 11,174,747 | B2 | 11/2021 | Roy Thill et al. |
| 11,174,795 | B2 | 11/2021 | Lutjen et al. |
| 11,181,006 | B2 | 11/2021 | Smoke et al. |
| 11,187,094 | B2 | 11/2021 | Feldmann et al. |
| 11,215,064 | B2 | 1/2022 | Arbona et al. |
| 11,215,065 | B2 | 1/2022 | Starr et al. |
| 11,215,081 | B2 | 1/2022 | Schilling et al. |
| 11,248,480 | B2 | 2/2022 | Thirumalai et al. |
| 11,255,208 | B2 | 2/2022 | Clark et al. |
| 11,255,209 | B2 | 2/2022 | Clark et al. |
| 11,286,812 | B1 | 3/2022 | Freeman et al. |
| 11,313,242 | B2 | 4/2022 | Cetel et al. |
| 11,319,827 | B2 | 5/2022 | Clark et al. |
| 11,319,828 | B1 | 5/2022 | Freeman et al. |
| 11,326,463 | B2 | 5/2022 | Blaney et al. |
| 11,326,470 | B2 | 5/2022 | Dyson et al. |
| 11,346,237 | B1 | 5/2022 | Freeman et al. |
| 11,346,251 | B1 | 5/2022 | Freeman et al. |
| 11,365,635 | B2 | 6/2022 | Read et al. |
| 11,441,434 | B2 | 9/2022 | Danis et al. |
| 11,441,441 | B1 | 9/2022 | Freeman et al. |
| 11,466,585 | B2 | 10/2022 | Arbona et al. |
| 11,466,586 | B2 | 10/2022 | Sippel et al. |
| 11,499,444 | B1 | 11/2022 | Freeman et al. |
| 11,506,085 | B2 | 11/2022 | Jarrossay et al. |
| 11,542,825 | B2 | 1/2023 | Hauswirth et al. |
| 11,542,827 | B2 | 1/2023 | Quennehen et al. |
| 11,624,291 | B2 | 4/2023 | Roy Thill et al. |
| 11,624,292 | B2 | 4/2023 | Clark et al. |
| 11,629,607 | B2 | 4/2023 | Freeman et al. |
| 11,643,939 | B2 | 5/2023 | Stoyanov et al. |
| 11,702,948 | B2 | 7/2023 | Hock et al. |
| 11,702,949 | B2 | 7/2023 | Freeman et al. |
| 11,713,694 | B1 | 8/2023 | Freeman et al. |
| 11,732,604 | B1 | 8/2023 | Freeman et al. |
| 11,761,351 | B2 | 9/2023 | Freeman et al. |
| 11,773,751 | B1 | 10/2023 | Freeman et al. |
| 11,781,440 | B2 | 10/2023 | Vincent et al. |
| 11,781,448 | B1 | 10/2023 | Holleran |
| 11,840,930 | B2 | 12/2023 | Propheter-Hinckley et al. |
| 11,840,936 | B1 | 12/2023 | Freeman et al. |
| 11,879,349 | B2 | 1/2024 | Schilling et al. |
| 2016/0348521 | A1 * | 12/2016 | Sippel ................... F01D 11/005 |
| 2018/0149029 | A1 * | 5/2018 | Vetters ................... F16J 15/022 |
| 2018/0238193 | A1 * | 8/2018 | Baucco ................. F01D 11/005 |
| 2019/0153886 | A1 * | 5/2019 | Vetters .................. F01D 25/005 |
| 2021/0017874 | A1 * | 1/2021 | Blaney .................... F01D 11/08 |
| 2021/0071541 | A1 * | 3/2021 | Thirumalai .......... F16J 15/0887 |
| 2023/0184124 | A1 | 6/2023 | Stoyanov et al. |
| 2023/0332506 | A1 | 10/2023 | Freeman et al. |
| 2024/0003267 | A1 | 1/2024 | Cazin et al. |

* cited by examiner

TURBINE SHROUD ASSEMBLY WITH INTER-SEGMENT DAMPING

FIELD OF THE DISCLOSURE

The present disclosure relates generally to turbine shroud assemblies, and more specifically to sealing turbine shroud assemblies used with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds are made up of a number of segments arranged circumferentially adjacent to one another to form a ring. Such shrouds may include sealing elements between segments to block air from leaking through the segments during operation of the gas turbine engine.

SUMMARY

The present disclosure may comprise one or more of the following features and combinations thereof.

A turbine shroud assembly for use with a gas turbine engine may comprise a first shroud segment, a second shroud segment, and a seal assembly. The first shroud segment may include a first carrier segment arranged circumferentially at least partway around a central axis and a first blade track segment supported by the first carrier segment to define a first portion of a gas path of the turbine shroud assembly. The first blade track segment may have a first shroud wall that extends circumferentially partway around the central axis and a first attachment feature that extends radially outward from the first shroud wall. The first shroud wall may have a first radial outer surface and a first radial inner surface. The second shroud segment may be arranged circumferentially adjacent the first shroud segment about the central axis. The second shroud segment may include a second carrier segment arranged circumferentially at least partway around the central axis and a second blade track segment supported by the second carrier segment to define a second portion of the gas path of the turbine shroud assembly. The second blade track segment may have a second shroud wall that extends circumferentially partway around the central axis and a second attachment feature that extends radially outward from the second shroud wall. The second shroud wall may have a second radial outer surface and a second radial inner surface.

In some embodiments, the seal assembly may be configured to block gases from escaping the gas path radially between the first shroud segment and the second shroud segment. The seal assembly may include a strip seal and a damping coil. The strip seal may have an axial segment that extends axially along the first radial outer surface of the first shroud wall and the second radial outer surface of the second shroud wall to block the gases from passing radially between and beyond the first shroud wall and the second shroud wall. The damping coil may be arranged axially along the axial segment of the strip seal to apply a radial inward force to the axial segment of the strip seal so that the strip seal is urged radially inwardly to maintain engagement of the strip seal with the first shroud wall and the second shroud wall while allowing for radial misalignment of the first blade track segment relative to the second blade track segment during use of the turbine shroud assembly.

In some embodiments, the first carrier segment and the second carrier segment may cooperate to define a coil-receiving space that opens radially inwardly and receives the damping coil therein. The first carrier segment may include a first outer wall, a first flange, a second flange, a third flange, and a fourth flange. The first flange may extend radially inward from the first outer wall. The second flange may be axially spaced apart from the first flange and may extend radially inward from the first outer wall. The third flange may extend radially inward from the first outer wall and may be located axially between the first flange and the second flange. The fourth flange may extend radially inward from the first outer wall and may be located axially between the third flange and the second flange. The damping coil may be located axially between the first flange of the first carrier segment and the third flange of the first carrier segment.

In some embodiments, the first carrier segment may include a radial inner surface that extends axially between the first flange of the first carrier segment and the third flange of the first carrier segment. The damping coil may be located radially between the radial inner surface of the first carrier segment and the axial segment of the strip seal to engage each of the radial inner surface of the first carrier segment and the axial segment of the strip seal. The axial segment of the strip seal may extend between a first end and second end thereof opposite the first end. The strip seal may include a forward radial segment that extends axially forward and radially outward from the first end of the axial segment into the first carrier segment and an aft radial segment that extends axially aft and radially outward from the second end of the axial segment.

In some embodiments, the first carrier segment may include a first outer wall, a first flange, a second flange, a third flange, and a fourth flange. The first flange may extend radially inward from the first outer wall. The second flange may be axially spaced apart from the first flange and may extend radially inward from the first outer wall. The third flange may extend radially inward from the first outer wall and may be located axially between the first flange and the second flange. The fourth flange may extend radially inward from the first outer wall and may be located axially between the third flange and the second flange.

In some embodiments, the forward radial segment of the strip seal may extend into the first flange of the first carrier segment. The aft radial segment of the strip seal may be located axially aft of the second flange of the first carrier segment. The damping coil may be located axially between the first flange of the first carrier segment and the third flange of the first carrier segment. The forward radial segment of the strip seal may extend axially forward and radially outward from the first end of the axial segment into a slot formed in the first carrier segment to axially locate the strip seal relative to the first carrier segment.

In some embodiments, the forward radial segment may include a first portion that extends along a curved path axially forward and radially outward from the first end of the axial segment and a second portion that extends radially outward from the first portion along a straight path. The aft radial segment of the strip seal may be located axially aft of the first carrier segment and may engage an aft wall of the first carrier segment to axially locate the strip seal relative to the first carrier segment. The aft radial segment may include a first portion that extends along a curved path axially aft and radially outward from the second end of the axial segment and a second portion that extends radially outward from the first portion along a straight path.

In some embodiments, the first attachment feature of the first blade track segment may include a first attachment flange that extends radially outward from the first shroud wall and a second attachment flange that extends radially outward from the first shroud wall and axially spaced apart from the first attachment flange. The second attachment feature of the second blade track segment may include a third attachment flange that extends radially outward from the second shroud wall and a fourth attachment flange that extends radially outward from the second shroud wall and axially spaced apart from the third attachment flange. The damping coil may be located circumferentially between the first attachment flange of the first blade track segment and the third attachment flange of the second blade track segment.

According to another aspect of the present disclosure, a turbine shroud assembly for use with a gas turbine engine may comprise a first shroud segment, a second shroud segment, and a seal assembly. The first shroud segment may include a first carrier segment arranged circumferentially at least partway around a central axis and a first blade track segment supported by the first carrier segment to define a first portion of a gas path of the turbine shroud assembly. The first blade track segment may have a first shroud wall that extends circumferentially partway around the central axis and a first attachment feature that extends radially outward from the first shroud wall. The second shroud segment may be arranged circumferentially adjacent the first shroud segment about the central axis. The second shroud segment may include a second carrier segment arranged circumferentially at least partway around the central axis and a second blade track segment supported by the second carrier segment to define a second portion of the gas path of the turbine shroud assembly. The second blade track segment may have a second shroud wall that extends circumferentially partway around the central axis and a second attachment feature that extends radially outward from the second shroud wall. The seal assembly may be configured to block gases from escaping the gas path radially between the first shroud segment and the second shroud segment. The seal assembly may include a strip seal and a damping coil. The strip seal may extend axially along the first shroud wall and the second shroud wall. The damping coil may be arranged along the strip seal to apply a radial inward force to the strip seal so that the strip seal is urged radially inwardly to maintain engagement of the strip seal with the first shroud wall and the second shroud wall.

In some embodiments, the first carrier segment may include a first outer wall, a first flange, a second flange, a third flange, and a fourth flange. The first flange may extend radially inward from the first outer wall. The second flange may be axially spaced apart from the first flange and may extend radially inward from the first outer wall. The third flange may extend radially inward from the first outer wall and may be located axially between the first flange and the second flange. The fourth flange may extend radially inward from the first outer wall and may be located axially between the third flange and the second flange. The damping coil may be located axially between the first flange of the first carrier segment and the third flange of the first carrier segment.

In some embodiments, the first carrier segment may include a radial inner surface that extends axially between the first flange of the first carrier segment and the third flange of the first carrier segment. The damping coil may be located radially between the radial inner surface of the first carrier segment and the strip seal to engage each of the radial inner surface of the first carrier segment and the strip seal. The strip seal may include an axial segment, a forward radial segment, and an aft radial segment. The axial segment may extend axially along the first shroud wall and the second shroud wall between a first end and a second end thereof opposite the first end. The forward radial segment may extend axially forward and radially outward from the first end of the axial segment into the first flange of the first carrier segment. The aft radial segment may extend axially aft and radially outward from the second end of the axial segment. The aft radial segment of the strip seal may be located axially aft of the second flange of the first carrier segment.

In some embodiments, the damping coil may extend axially along the axial segment of the strip seal to apply the radial inward force to the axial segment of the strip seal so that the axial segment of the strip seal engages each of the first shroud wall and the second shroud wall. The first attachment feature of the first blade track segment may include a first attachment flange that extends radially outward from the first shroud wall and a second attachment flange that extends radially outward from the first shroud wall and axially spaced apart from the first attachment flange. The second attachment feature of the second blade track segment may include a third attachment flange that extends radially outward from the second shroud wall and a fourth attachment flange that extends radially outward from the second shroud wall and axially spaced apart from the third attachment flange. The damping coil may be located circumferentially between the first attachment flange of the first blade track segment and the third attachment flange of the second blade track segment.

A method of assembling a turbine shroud assembly for use with a gas turbine engine may comprise assembling a first shroud segment by coupling a first blade track segment with a first carrier segment to support the first blade track segment radially inward of the first carrier segment. The method may include assembling a second shroud segment by coupling a second blade track segment with a second carrier segment to support the second blade track segment radially inward of the second carrier segment. The method may include locating a strip seal on a first radial outer surface of the first blade track segment and a second radial outer surface of the second blade track segment. The method may include locating a damping coil radially between the first carrier segment and the strip seal so that the damping coil engages the first carrier segment and the strip seal. The method may include applying a radial inward force to the strip seal with the damping coil to maintain engagement of the strip seal with the first radial outer surface of the first blade track segment and the second radial outer surface of the second blade track segment in response to radial misalignment of the first blade track segment relative to the second blade track segment.

In some embodiments, the step of applying a radial inward force includes applying the radial inward force along a centerline of the strip seal located between circumferential ends of the strip seal. In some embodiments, the step of locating a strip seal includes locating a forward radial segment of the strip seal in a slot formed in a first flange of the first carrier segment and locating an aft radial segment of the strip seal axially aft of the first carrier segment.

These and other features of the present disclosure will become more apparent from the following description of the illustrative embodiments.

DETAILED DESCRIPTION

Figure 1:
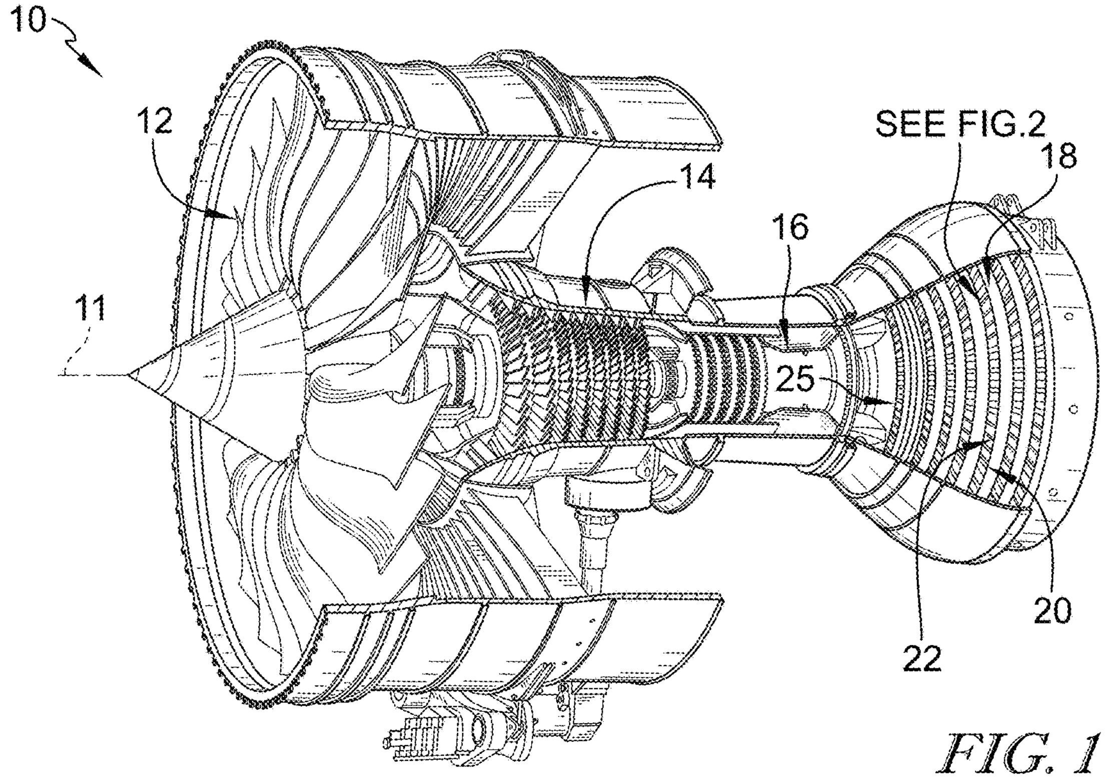
FIG. 1 is a cutaway perspective view of a gas turbine engine that includes a fan, a compressor, a combustor, and a turbine, the turbine including a turbine shroud assembly that extends circumferentially around an axis of the gas turbine engine and turbine wheel assemblies that are driven to rotate about the axis to generate power.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12. In some embodiments, the fan 12 may be replaced with a propeller, drive shaft, or other suitable configuration.

Figure 2:
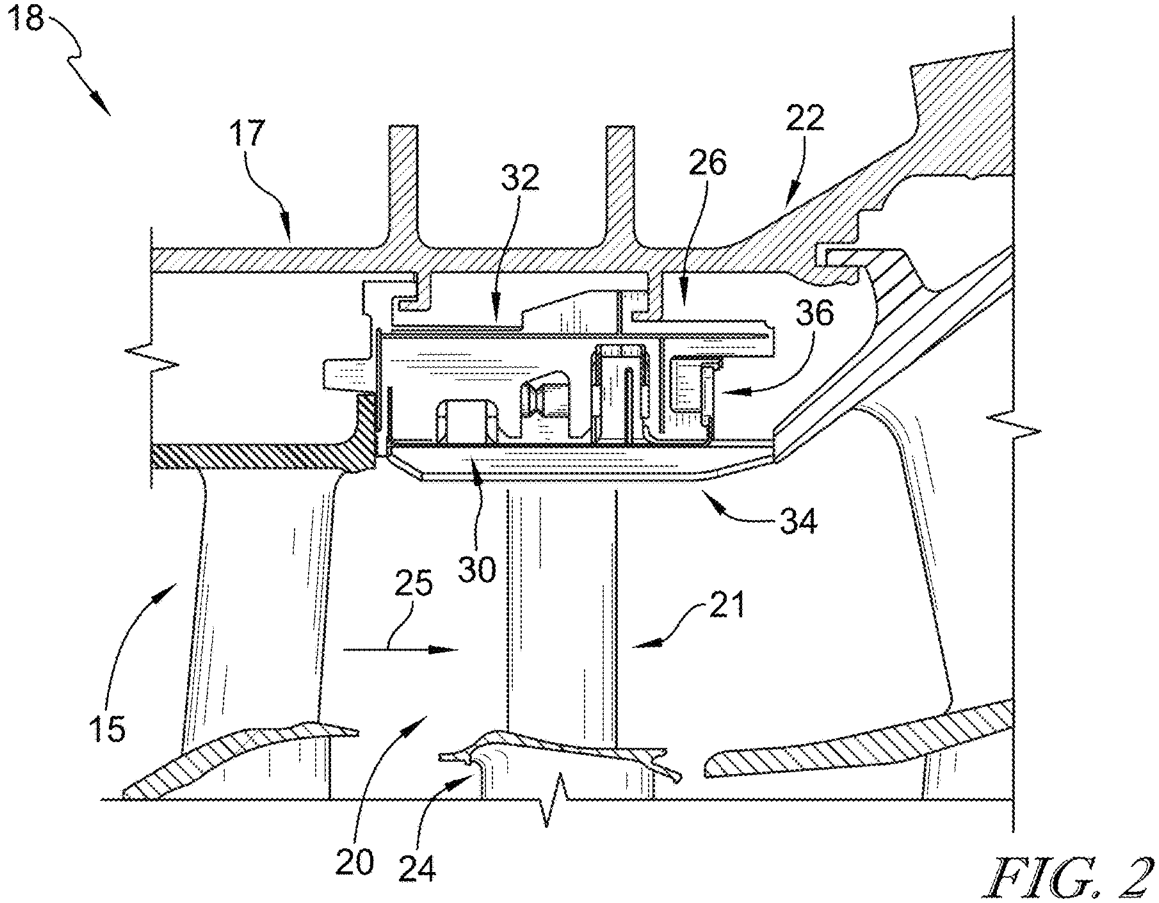
FIG. 2 is a cutaway perspective view of a portion of the turbine shroud assembly of FIG. 1 showing one of the turbine wheel assemblies and a first shroud segment of a plurality of shroud segments arranged around the turbine wheel assembly, the first shroud segment including a first carrier segment, a first blade track segment that defines a first portion of a gas path of the turbine, and a first retainer that couples the first blade track segment with the first carrier segment, and further showing that a seal assembly of the turbine shroud assembly extends circumferentially into the first shroud segment to block gases from passing between the first shroud segment and a circumferentially adjacent second shroud segment.

The turbine 18 includes at least one turbine wheel assembly 20 and a turbine shroud assembly 22 positioned to surround the turbine wheel assembly 20 as shown in FIGS. 1 and 2. The turbine wheel assembly 20 includes a plurality of blades 21 coupled to a rotor disk 24 for rotation with the rotor disk 24. The hot, high-pressure combustion products from the combustor 16 are directed toward the blades 21 of the turbine wheel assemblies 20 along a gas path 25. The turbine wheel assembly 20 further includes a plurality of vanes 15 as shown in FIG. 2. The turbine shroud assembly 22 is coupled to an outer case 17 of the gas turbine engine 10 and extends around the turbine wheel assembly 20 to block gases from passing over the blades 21 during use of the turbine 18 in the gas turbine engine 10.

Figure 4:
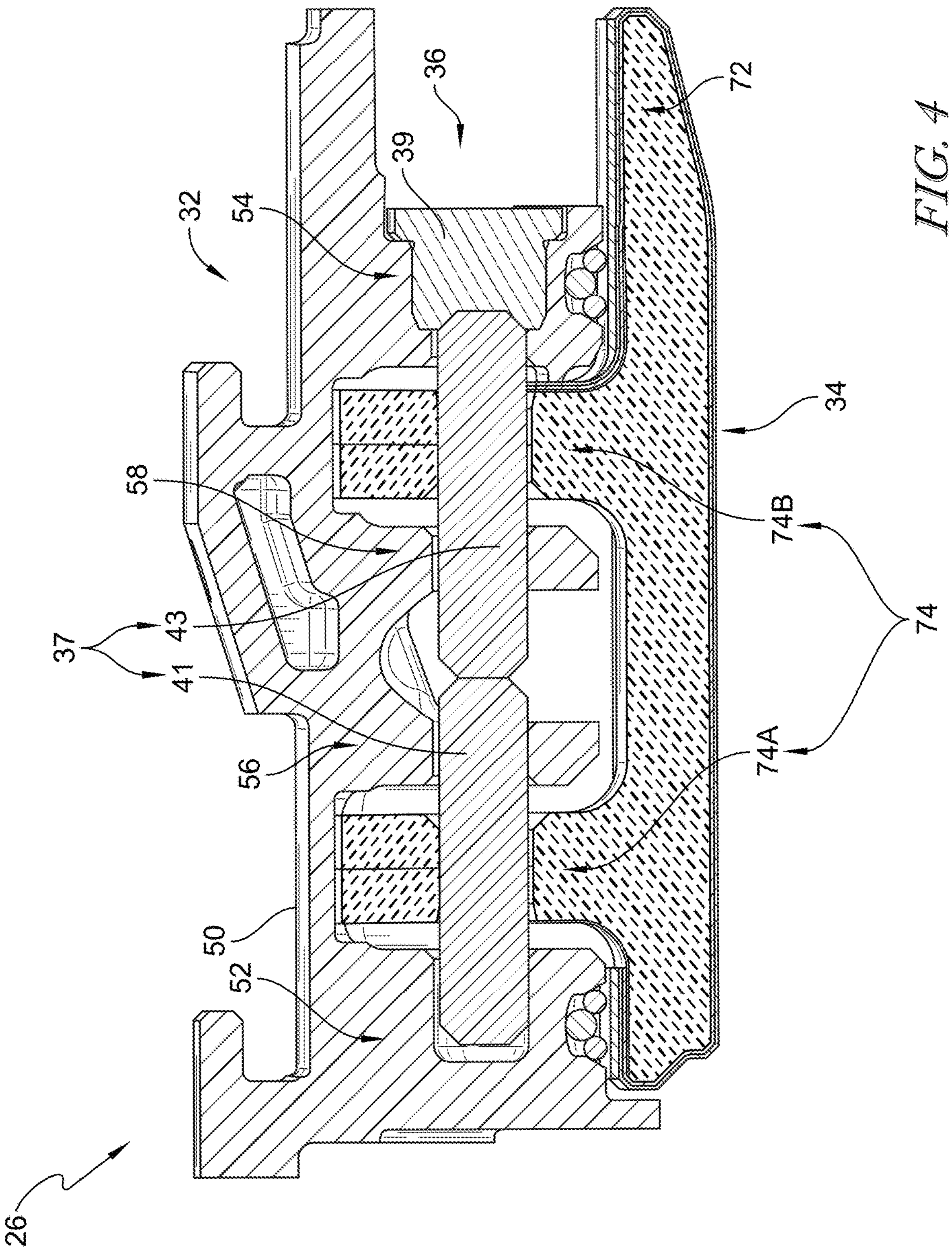
FIG. 4 is a cross-sectional view of the first shroud segment of FIG. 3 showing that the first retainer extends through the first blade track segment and through the first carrier segment to couple the first blade track segment to the first carrier segment.
Figure 5:
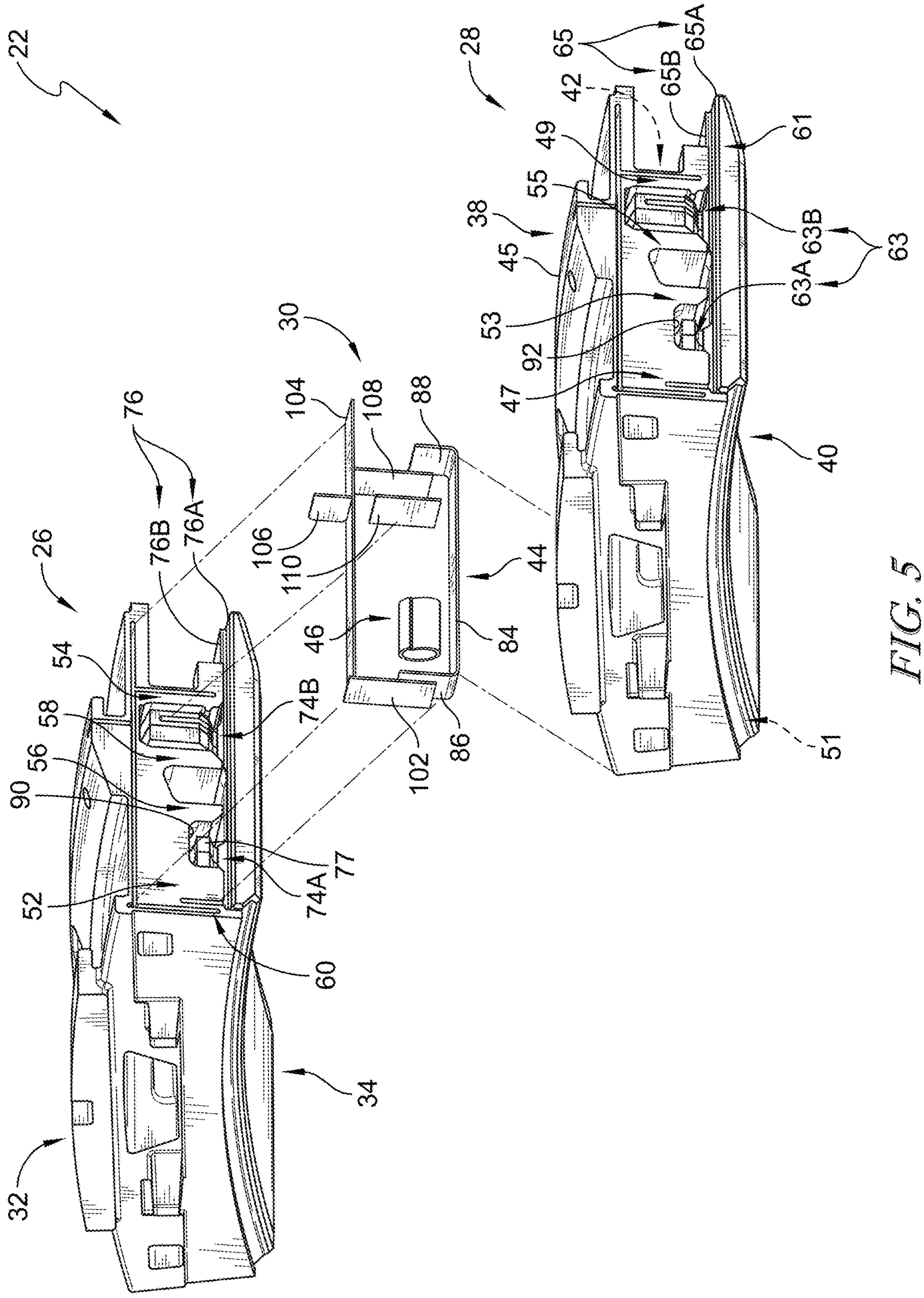
FIG. 5 is an exploded view of the first and second shroud segments used in the gas turbine engine of FIG. 1 showing the first shroud segment and the second shroud segment spaced apart from the first shroud segment, the second shroud segment including a second carrier segment and a second blade track segment supported by the second carrier segment, and further suggesting that the seal assembly extends circumferentially into the first shroud segment and the second shroud segment to block gases from escaping the gas path radially between the first shroud segment and the second shroud segment.

The turbine shroud assembly 22 includes a plurality of shroud segments and a plurality of seal assemblies between adjacent shroud segments as suggested in FIGS. 2 and 5. Of the plurality of shroud segments, a first shroud segment 26 and a second shroud segment 28 are discussed in detail below. Likewise, a seal assembly 30 included in the plurality of seal assemblies used in the turbine shroud assembly 22 is shown in FIGS. 2-8. The first shroud segment 26, the second shroud segment 28, and the seal assembly 30 are representative of other adjacent shroud segments and plurality of seal assemblies included in the turbine shroud assembly 22.

Figure 3:
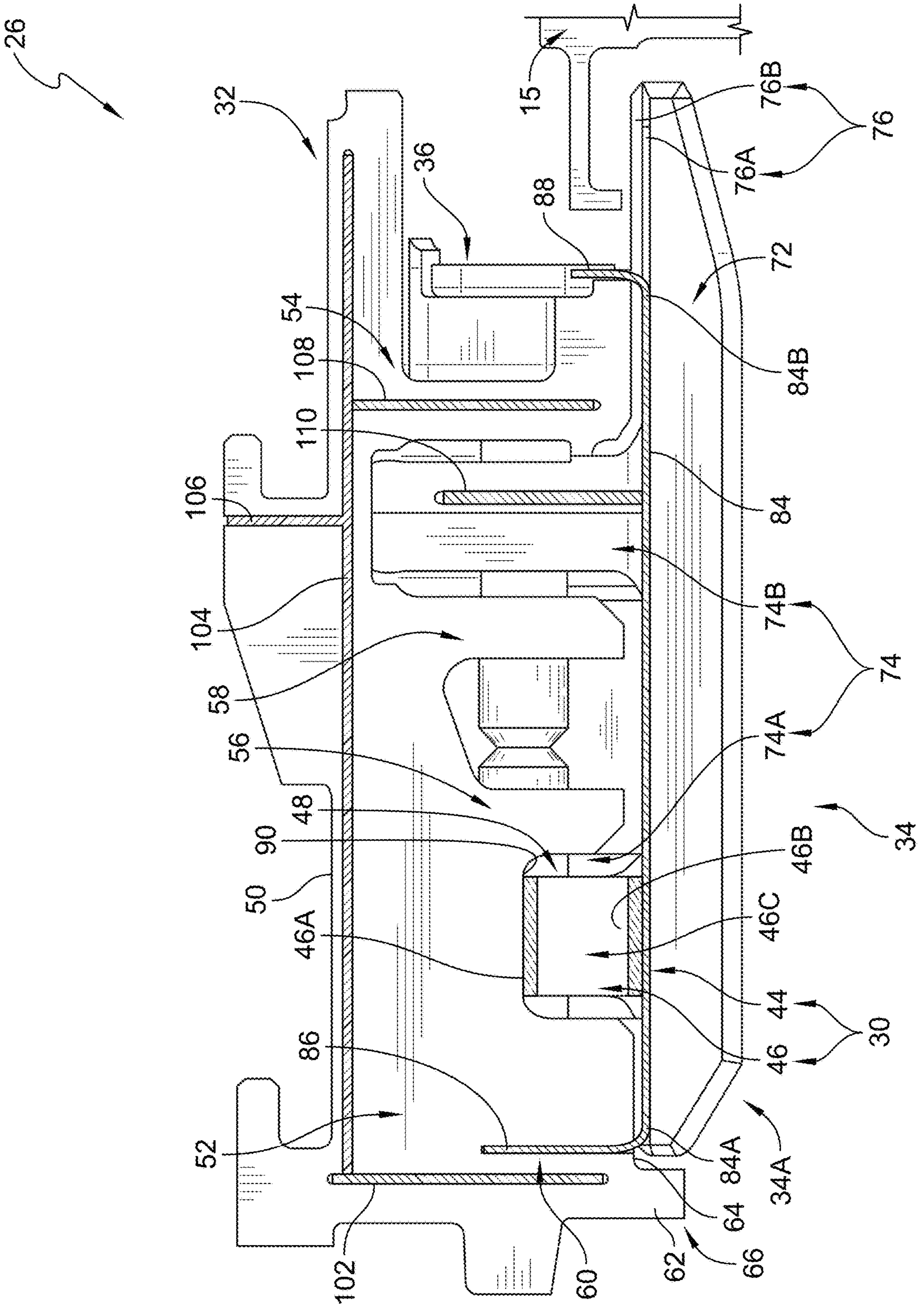
FIG. 3 is a cross-sectional view of the turbine shroud assembly through the seal assembly of FIG. 2 showing that the first blade track segment includes a first shroud wall that defines a first radial outer surface, and further showing that a strip seal of the seal assembly extends axially along the first radial outer surface of the first shroud wall and a damping coil of the seal assembly is located radially outward of the strip seal to apply a radial inward force to the strip seal so that the strip seal maintains engagement with the first radial outer surface of the first shroud wall and a second radial outer surface of a circumferentially adjacent second shroud wall.

The seal assembly 30 in the illustrative embodiment includes a strip seal 44 and a damping coil 46 as shown in FIG. 3. The strip seal 44 blocks gases from the gas path 25 from passing radially between the first shroud segment 26 and the second shroud segment 28. The damping coil 46 urges the strip seal 44 radially inward and into engagement with the shroud segments 26, 28. In some embodiments, the seal assembly 30 includes strip seals 102, 104, 106, 108, 110 as shown in FIGS. 3 and 5. Any of the strip seals 102, 104, 106, 108, 110 may be included or omitted from the seal assembly 30. The strip seals 102, 104, 106, 108, 110 are representative of more conventional strip seals.

Figure 6:
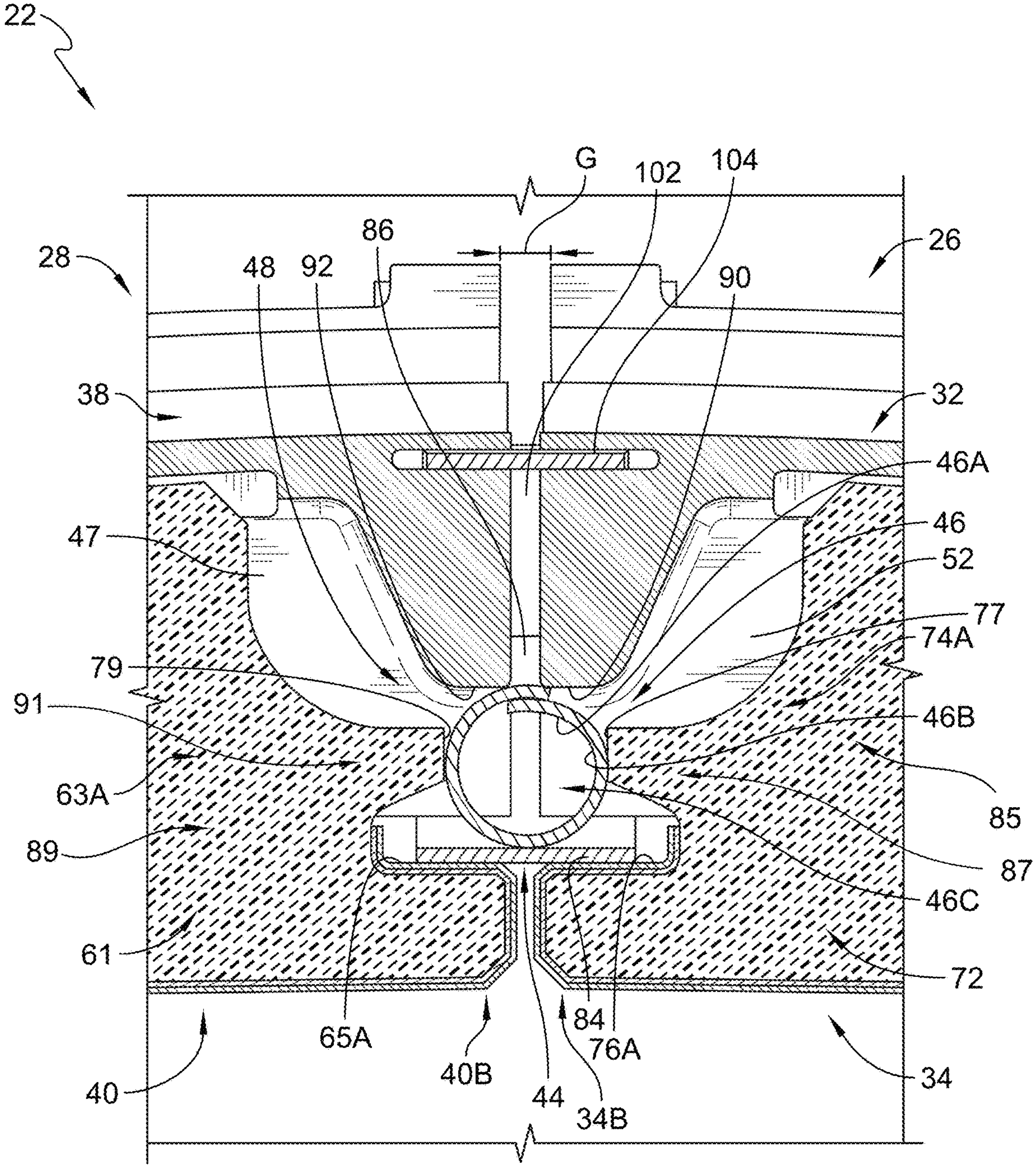
FIG. 6 is a cross-sectional view through the first and second shroud segments as assembled in the turbine shroud assembly of FIG. 1 showing that the first shroud segment and the second shroud segment are assembled adjacent one another and the strip seal extends circumferentially between the first shroud segment and the second shroud segment, and further showing that the first carrier segment and the second carrier segment cooperate to define a coil-receiving space that opens radially inwardly to receive the damping coil therein and to locate the damping coil radially outward of the axial segment of the strip seal.

The second shroud segment 28 is arranged circumferentially adjacent the first shroud segment 26 about the central axis 11. A circumferential gap G is formed between the first shroud segment 26 and the second shroud segment 28 as shown in FIG. 6. Though the turbine shroud assembly 22 is shown and described as having two shroud segments 26, 28 and a seal assembly 30, the turbine shroud assembly 22 includes additional shroud segments and additional seal assemblies so that the turbine shroud assembly 22 extends entirely circumferentially about the central axis 11 as suggested in FIG. 1.

The first shroud segment 26 includes a first carrier segment 32, a first blade track segment 34, and a first retainer 36 as shown in FIGS. 3 and 4. The first carrier segment 32 is arranged circumferentially at least partway around the central axis 11 and is coupled with the outer case 17 with hook features in the illustrative embodiment. The first blade track segment 34 is supported by the first carrier segment 32 to define a first portion of the gas path 25. The first retainer 36 extends axially through the first carrier segment 32 and the first blade track segment 34 to couple the first carrier segment 32 and the first blade track segment 34 together.

The second shroud segment 28 includes a second carrier segment 38, a second blade track segment 40, and a second retainer 42 as shown in FIG. 5. The second carrier segment 38 is arranged circumferentially at least partway around the central axis 11 and is coupled with the outer case 17 with hook features in the illustrative embodiment. The second blade track segment 40 is supported by the second carrier segment 38 to define a second portion of the gas path 25. The second retainer 42 extends axially through the second carrier segment 38 and the second blade track segment 40 to couple the second carrier segment 38 and the second blade track segment 40 together.

The seal assembly 30 extends circumferentially into the first shroud segment 26 and the second shroud segment 28 as shown in FIG. 6 and as suggested in FIG. 5. The seal assembly 30, along with the other strip seals 102, 104, 106, 108, 110, blocks gases in the gas path 25 from escaping the gas path 25 radially outward and circumferentially between the first shroud segment 26 and the second shroud segment 28 through the circumferential gap G.

Radial misalignment of the first blade track segment 34 relative to the second blade track segment 40 (or vice versa) may be a concern in turbine shroud assemblies. During radial misalignment of the blade track segments 34, 40, the strip seal 44 may not engage each of the blade track segments 34, 40. If the strip seal 44 does not engage each of the blade track segments 34, 40, gases from the gas path 25 may pass radially between and beyond the first shroud segment 26 and the second shroud segment 28. To allow for radial misalignment of the first blade track segment 34 relative to the second blade track segment 40, and thus, reduce the possibility of leakage of gases between the shroud segments 26, 28, the damping coil 46 applies a radial inward force to the strip seal 44 so that the strip seal 44 is urged radially inwardly to maintain engagement of the strip seal 44 with the blade track segments 34, 40, even during radial misalignment of the blade track segments 34, 40 as suggested in FIGS. 7 and 8.

Turning back to the first shroud segment 26, the first carrier segment 32 of the first shroud segment 26 includes a first outer wall 50, a first flange 52, and a second flange 54 as shown in FIG. 3. The first flange 52 extends radially inward from the first outer wall 50. The second flange 54 is axially spaced apart from the first flange 52 and extends radially inward from the first outer wall 50. The first flange 52 is formed to include a first slot 60 as shown in FIG. 3. The first slot 60 extends circumferentially into the first flange 52 and is shaped to receive a portion of the strip seal 44 therein.

The first flange 52 of the first carrier segment 32 includes a first wall 62 formed to include a radially inward facing surface 64 as shown in FIG. 3. The first slot 60 extends axially forward and radially outward into the first flange 52 from the radially inward facing surface 64 to match the curvature of a portion of the strip seal 44 that extends into the first slot 60. A first protrusion 66 extends radially inward from the first wall 62 axially forward of the first slot 60. The first protrusion 66 is located axially forward of the first blade track segment 34 to cover an axial forward end 34A of the first blade track segment 34. The first protrusion 66 blocks at least a portion of the gases flowing through the gas path 25 from flowing axially into the strip seal 44.

The first carrier segment 32 further includes a third flange 56 and a fourth flange 58 as shown in FIG. 3. Each of the third flange 56 and the fourth flange 58 extends radially inward from the first outer wall 50. The third flange 56 is located axially between the first flange 52 and the fourth flange 58. The fourth flange 58 is located axially between the third flange 56 and the second flange 54. Each of the flanges 52, 54, 56, and 58 of the first carrier segment 32 is formed to include a hole that receives the first retainer 36 therein as shown in FIGS. 3 and 4. Illustratively, the first carrier segment 32 is made of metallic materials.

The first blade track segment 34 includes a first shroud wall 72 and a first attachment feature 74 that extends radially outward from the first shroud wall 72 as shown in FIGS. 3 and 4. The first shroud wall 72 extends circumferentially partway around the central axis 11. The first shroud wall 72 has a first radial outer surface 76 that faces toward the first carrier segment 32 and a first radial inner surface opposite the first radial outer surface 76 that faces toward the gas path 25. Illustratively, the first attachment feature 74 includes a first attachment flange 74A and a second attachment flange 74B axially aft of the first attachment flange 74A. Each of the attachment flanges 74A, 74B is formed to include a hole that receives the first retainer 36 therein. The first attachment flange 74A is located axially between the first flange 52 and the third flange 56 as shown in FIG. 3. The first attachment flange 74A is formed to include a body 85 extending radially outward from the first shroud wall 72 and a circumferentially-extending member 87 that extends circumferentially away from the body 85 as shown in FIG. 6. The circumferentially-extending member 87 includes a first circumferential surface 77 that faces toward the second shroud segment 28 as shown in FIG. 5. The second attachment flange 74B is located axially between the fourth flange 58 and the second flange 54. Illustratively, the first blade track segment 34 is made of ceramic matrix composite materials.

Figure 7:
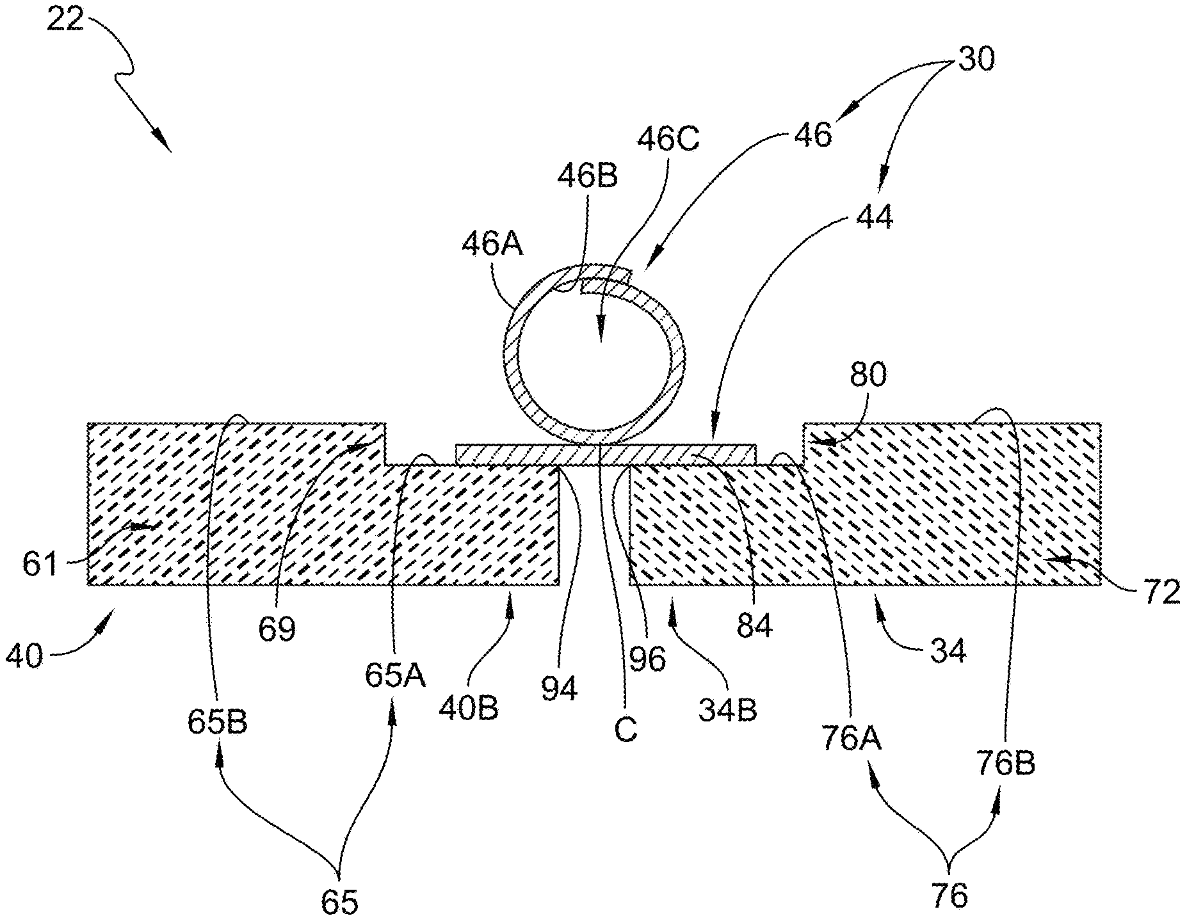
FIG. 7 is a cross-sectional diagrammatic view through the first and second shroud segments as assembled in the turbine shroud assembly of FIG. 1 showing that the damping coil applies a radial inward force along a centerline of the strip seal so that the strip seal is urged radially inwardly against the first radial outer surface of the first shroud wall and the second radial outer surface of the second shroud wall to maintain engagement of the strip seal with the first shroud wall and the second shroud wall during use of the turbine shroud assembly.
Figure 8:
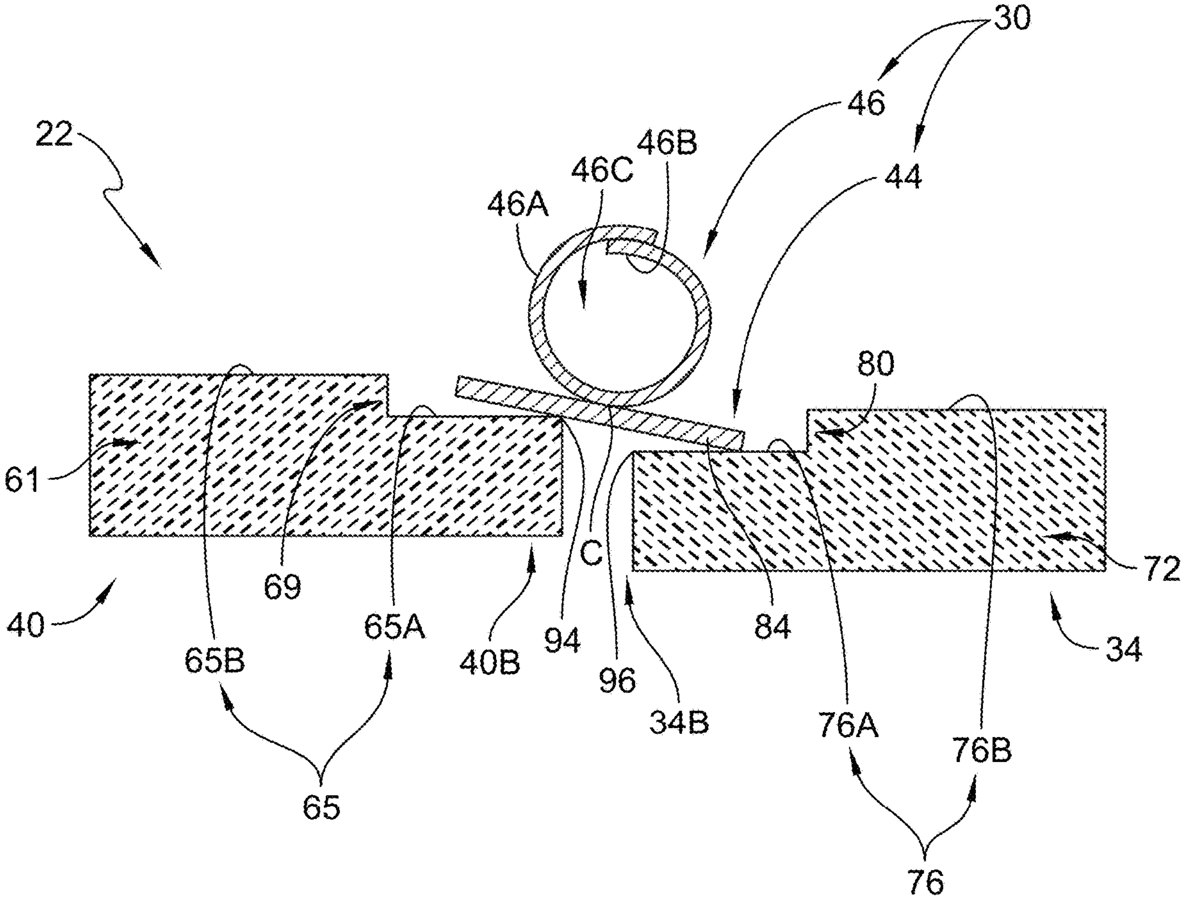
FIG. 8 is a cross-sectional diagrammatic view similar to FIG. 7 showing that the damping coil applies the radial inward force along the centerline of the strip seal so that, during radial misalignment of the first blade track segment relative to the second blade track segment during use of the turbine shroud assembly, the strip seal is urged radially inwardly against the first radial outer surface of the first shroud wall and the second radial outer surface of the second shroud wall to maintain engagement of the strip seal with the first shroud wall and the second shroud wall.

The first radial outer surface 76 of the first shroud wall 72 includes a first portion 76A and a second portion 76B as shown in FIG. 7. The second portion 76B is spaced radially outward from the first portion 76A. The first portion 76A defines a circumferential end 34B of the first shroud wall 72 that confronts the second blade track segment 40 as shown in FIGS. 6 and 7. The second portion 76B extends circumferentially away from the first portion 76A. The circumferential end 34B is formed with a first pocket 80 that defines the first portion 76A of the first radial outer surface 76 as shown in FIGS. 7 and 8. The first shroud wall 72 slopes radially inwardly at the circumferential end 34B to define the first portion 76A of the first radial outer surface 76. The first and second portions 76A, 76B of the first radial outer surface 76 are exposed to air located radially between the first carrier segment 32 and the first blade track segment 34. The strip seal 44 of the seal assembly 30 is located on the first portion 76A of the first radial outer surface 76 as shown in FIGS. 6 and 7.

In the illustrative embodiment, the first retainer 36 includes a mount pin 37 and a mount plug 39 as shown in FIG. 4. The first retainer 36 couples the first blade track segment 34 to the first carrier segment 32 as shown in FIGS. 3 and 4. The mount pin 37 extends through the first blade track segment 34 and into the first carrier segment 32. The mount plug 39 fits into the first carrier segment 32 axially aft of the mount pin 37 and circumferentially aligned with the mount pin 37. In the illustrative embodiment, the mount pin 37 includes a forward pin 41 and an aft pin 43 as shown in FIG. 4. The forward pin 41 and the aft pin 43 of the mount pin 37 are circumferentially aligned with one another. In this embodiment, the forward pin 41 is separate from the aft pin 43 so as to allow for independent loading during use in the gas turbine engine 10. In some embodiments, the mount pin 37 is formed as a single pin. Though not shown, in the illustrative embodiment, an additional first retainer is included in the first shroud segment 26 spaced apart circumferentially from the first retainer 36 such that the first shroud segment 26 includes two forward pins 41, two aft pins 43, and two mount plugs 39.

The second carrier segment 38 of the second shroud segment 28 includes a second outer wall 45, a fifth flange 47, and a sixth flange 49 as shown in FIG. 5. The fifth flange 47 extends radially inward from the second outer wall 45. The sixth flange 49 is axially spaced apart from the fifth flange 47 and extends radially inward from the second outer wall 45. The fifth flange 47 is formed to include a second slot 51 as shown in FIG. 5. The second slot 51 extends into the fifth flange 47 axially forward and radially outward to receive a portion of the strip seal 44 therein. The first slot 60 and the second slot 51 are aligned with one another while the first shroud segment 26 and the second shroud segment 28 are assembled adjacent one another.

The second carrier segment 38 further includes a seventh flange 53 and an eighth flange 55 as shown in FIG. 5. Each of the seventh flange 53 and the eighth flange 55 extend radially inward from the second outer wall 45. The seventh flange 53 is located axially between the fifth flange 47 and the eighth flange 55. The eighth flange 55 is located axially between the seventh flange 53 and the sixth flange 49. The seventh and eighth flanges 53, 55 may be inner flanges or clevises that are both located axially inward of the fifth flange 47 and the sixth flange 49. Each of the flanges 47, 49, 53, 55 of the second carrier segment 38 is formed to include a hole that receives the second retainer 42 therein.

The second blade track segment 40 includes a second shroud wall 61 and a second attachment feature 63 that extends radially outward from the second shroud wall 61 as shown in FIG. 5. The second shroud wall 61 has a second radial outer surface 65 that faces toward the second carrier segment 38 and a second radial inner surface opposite the second radial outer surface 65 that faces toward the gas path 25. The second shroud wall 61 extends circumferentially partway around the central axis 11. Illustratively, the second attachment feature 63 includes a third attachment flange 63A and a fourth attachment flange 63B axially aft of the third attachment flange 63A. Each of the attachment flanges 63A, 63B is formed to include a hole that receives the second retainer 42 therein. The third attachment flange 63A is located axially between the fifth flange 47 and the seventh flange 53. The third attachment flange 63A is formed to include a body 89 extending radially outward from the second shroud wall 61 and a circumferentially-extending member 91 that extends circumferentially away from the body 89 as shown in FIG. 6. The circumferentially-extending member 91 includes a second circumferential surface 79 that faces toward the first shroud segment 26 as shown in FIG. 6. The fourth attachment flange 63B is located axially between the eighth flange 55 and the sixth flange 49. Illustratively, the second blade track segment 40 is made of ceramic matrix composite materials.

The second radial outer surface 65 of the second shroud wall 61 includes a first portion 65A and a second portion 65B as shown in FIGS. 7 and 8. The second portion 65B is spaced radially outward from the first portion 65A. The first portion 65A defines a circumferential end 40B of the second shroud wall 61 that confronts the first blade track segment 34 as shown in FIG. 6. The second portion 65B extends circumferentially away from the first portion 65A. The circumferential end 40B is formed with a second pocket 69 that defines the first portion 65A of the second radial outer surface 65. The second shroud wall 61 slopes radially inwardly at the circumferential end 40B to define the first portion 65A of the second radial outer surface 65. The first and second portions 65A, 65B of the second radial outer surface 65 are exposed to air located radially between the second carrier segment 38 and the second blade track segment 40. The strip seal 44 is located on the first portion 65A of the second radial outer surface 65 as shown in FIG. 6. The second retainer 42 is the same as the first retainer 36 such that description of the first retainer 36 also applies to the second retainer 42.

The seal assembly 30 includes the strip seal 44 and the damping coil 46 as shown in FIG. 3. The strip seal 44 extends between the first blade track segment 34 and the second blade track segment 40 to block the gases from passing radially between and beyond the first shroud wall 72 and the second shroud wall 61 as shown in FIGS. 6 and 7. The damping coil 46 is located radially outward of the strip seal 44 and extends between the first shroud segment 26 and the second shroud segment 28.

The strip seal 44 includes an axial segment 84, a forward radial segment 86, and an aft radial segment 88 as shown in FIGS. 3 and 5. The axial segment 84 extends axially along the first portion 76A of the first radial outer surface 76 of the first shroud wall 72 and the first portion 65A of the second radial outer surface 65 of the second shroud wall 61 between a first axial end 84A and a second axial end 84B thereof opposite the first axial end 84A. The forward radial segment 86 is coupled to the first axial end 84A of the axial segment

84 and extends axially forward and radially outward from the first axial end 84A into the first slot 60 formed in the first flange 52 of the first carrier segment 32 and the second slot 51 formed in the fifth flange 47 of the second carrier segment 38. Illustratively, at least a portion of the forward radial segment 86 extends along a curvilinear path and at least another portion of the forward radial segment 86 extends along a straight path. The forward radial segment 86 extending into the slots 60, 51 retains the axial segment 84 axially relative to the first shroud segment 26 so that the axial segment 84 does not move fore and aft.

The aft radial segment 88 of the strip seal 44 is coupled to the second axial end 84B of the axial segment 84 as shown in FIG. 3. The aft radial segment 88 extends axially aft and radially outward from the second axial end 84B of the axial segment 84. The aft radial segment 88 is located axially aft of the second flange 54 of the first carrier segment 32 and the sixth flange 49 of the second carrier segment 38. In some embodiments, the aft radial segment 88 abuts an aft wall of the second flange 54 and/or an aft wall of the sixth flange 49. In some embodiments, the aft radial segment 88 abuts a vane 15 as suggested in FIG. 3. Illustratively, at least a portion of the aft radial segment 88 extends along a curvilinear path and at least another portion of the aft radial segment 88 extends along a straight path. The engagement of the aft radial segment 88 with the second flange 54 axially locates the strip seal 44 relative to the first shroud segment 26.

A radial inner surface of the axial segment 84 directly contacts the first portions 76A, 65A of the shroud walls 72, 61 as shown in FIG. 6. A radial outer surface of the axial segment 84 is exposed to air that is radially between the carrier segments 32, 38 and the blade track segments 34, 40.

The first pocket 80 of the first blade track segment 34 and the second pocket 69 of the second blade track segment 40 retain the axial segment 84 of the strip seal 44 circumferentially between the first blade track segment 34 and the second blade track segment 40 as suggested in FIGS. 7 and 8. The axial segment 84 may move circumferentially a marginal amount, however, the pockets 80, 69 block the axial segment 84 from moving such that the circumferential gap G is no longer blocked.

The damping coil 46 is arranged radially outward of the strip seal 44 as shown in FIG. 3. The damping coil 46 extends axially along the axial segment 84 of the strip seal 44. Illustratively, the damping coil 46 is made of a curved sheet having a cylindrical shape with overlapping ends. In some embodiments, the damping coil 46 is made of metal.

The damping coil 46 is received in a coil-receiving space 48 as shown in FIGS. 3 and 6. The first carrier segment 32 and the second carrier segment 38 cooperate to define the coil-receiving space 48. The coil-receiving space 48 opens radially inwardly. The first flange 52 of the first carrier segment 32 and the fifth flange 47 of the second carrier segment 38 define a forward-most boundary of the coil-receiving space 48. The third flange 56 of the first carrier segment 32 and the seventh flange 53 of the second carrier segment 38 define an aft-most boundary of the coil-receiving space 48. A first radial inner surface 90 of the first carrier segment 32 that extends axially between and interconnects the first flange 52 and the third flange 56 and a second radial inner surface 92 of the second carrier segment 38 that extends axially between and interconnects the fifth flange 47 and the seventh flange 53 define a radial-outer boundary of the coil-receiving space 48.

The damping coil 46 is blocked from axial movement by the first flange 52, the fifth flange 47, the third flange 56, and the seventh flange 53 as suggested in FIGS. 3 and 5. The damping coil 46 is blocked from radial movement by the first radial inner surface 90 of the first carrier segment 32, the second radial inner surface 92 of the second carrier segment 38, and the axial segment 84 of the strip seal 44. The damping coil 46 is blocked from circumferential movement by the first circumferential surface 77 of the first attachment flange 74A and the second circumferential surface 79 of the third attachment flange 63A as shown in FIG. 6.

The damping coil 46 includes an outer surface 46A and an inner surface 46B opposite the outer surface 46A as shown in FIGS. 3 and 6. The damping coil 46 defines a hollow core 46C that extends axially through the damping coil 46 as shown in FIGS. 3, 5, and 6. The outer surface 46A of the damping coil 46 engages the carrier segments 32, 38, the blade track segments 34, 40, and/or the axial segment 84 of the strip seal 44.

As shown in FIGS. 6-8, the damping coil 46 applies a radial inward force to the axial segment 84 of the strip seal 44. The outer surface 46A of the damping coil 46 engages the first circumferential surface 77 of the first attachment flange 74A, the second circumferential surface 79 of the third attachment flange 63A, the first radial inner surface 90 of the first carrier segment 32, and/or the second radial inner surface 92 of the second carrier segment 38 to apply the radial inward force. The radial inward force urges the strip seal 44 radially inwardly against the first portion 76A of the first radial outer surface 76 of the first shroud wall 72 and the first portion 65A of the second radial outer surface 65 of the second shroud wall 61 to maintain engagement of the strip seal 44 with each of the shroud walls 72, 61. The radial inward force applied by the damping coil 46 ensures that the strip seal 44 engages each of the shroud walls 72, 61 during radial misalignment of the first blade track segment 34 relative to the second blade track segment 40 (or vice versa) during use of the turbine shroud assembly 22.

The damping coil 46 applies the radial inward force along a centerline C of the axial segment 84 of the strip seal 44 defined between circumferential ends of the axial segment 84 as shown in FIGS. 6-8. The centerline C of the axial segment 84 is located equidistant from each of the circumferential ends of the axial segment 84. As shown in FIG. 8, the first blade track segment 34 is radially misaligned relative to the second blade track segment 40. The first blade track segment 34 is located more radially inward as compared to the second blade track segment 40. The damping coil 46 applies the radial inward force along the centerline C of the axial segment 84 so that the axial segment 84 engages each of the shroud walls 72, 61. Due to the radial inward force along the centerline C, the axial segment 84 of the strip seal 44 pivots around a circumferential corner 94 (i.e., a fulcrum) of the second shroud wall 61 so that the axial segment 84 pivots to engage the first portion 76A of the first radial outer surface 76 of the first shroud wall 72. The damping coil 46, thus, allows for radial misalignment between the blade track segments 34, 40 as the damping coil 46 ensures that the strip seal 44 engages each of the shroud walls 72, 61, even during radial misalignment of the blade track segments 34, 40.

During radial misalignment of the blade track segments 34, 40, the axial segment 84 of the strip seal 44 does not lie flush with the first portion 76A of the first radial outer surface 76 of the first shroud wall 72 and the first portion 65A of the second radial outer surface 65 of the second shroud wall 61, as shown in FIG. 8. While the blade track segments 34, 40 are radially aligned, the axial segment 84 of the strip seal 44 may lie flush with the first portion 76A of the first radial outer surface 76 of the first shroud wall 72 and the first portion 65A of the second radial outer surface 65 of the second shroud wall 61, as shown in FIG. 7.

As another example, if the second blade track segment 40 is located more radially inward as compared to the first blade track segment 34, the axial segment 84 of the strip seal 44 pivots around a circumferential corner 96 (i.e., a fulcrum) of the first shroud wall 72 so that the axial segment 84 pivots to engage the first portion 65A of the second radial outer surface 65 of the second shroud wall 61. Thus, the circumferential corner 94, 96 around which the axial segment 84 pivots is determined by which blade track segment 34, 40 is located more radially outward as compared to the other blade track segment 34, 40.

Without the damping coil 46, a radial gap is formed during radial misalignment of the blade track segments 34, 40 between the axial segment 84 of the strip seal 44 and one of the shroud walls 72, 61 such that the strip seal 44 does not engage each of the shroud walls 72, 61. The damping coil 46 ensures that the strip seal 44 engages each of the shroud walls 72, 61 without the use of other seals, such as w-seals.

In some embodiments, the turbine shroud assembly 22 further includes strip seals 102, 104, 106, 108, 110 as shown in FIGS. 3 and 5. Each of the strip seals 102, 104, 106, 108 extends into the first carrier segment 32 and the second carrier segment 38. The strip seal 110 extends into each of the second attachment flange 74B of the first blade track segment 34 and the fourth attachment flange 63B of the second blade track segment 40. The first carrier segment 32 and the second carrier segment 38 are each formed to include grooves sized to receive the strip seals 102, 104, 106, 108 therein as shown in FIGS. 3 and 5. The second attachment flange 74B of the first blade track segment 34 and the fourth attachment flange 63B of the second blade track segment 40 are each formed to include a groove sized to receive the strip seal 110 therein. The strip seals 102, 104, 106, 108, 110 provide additional sealing between the first shroud segment 26 and the second shroud segment 28.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising:

a first shroud segment including a first carrier segment arranged circumferentially at least partway around a central axis and a first blade track segment supported by the first carrier segment to define a first portion of a gas path of the turbine shroud assembly, the first blade track segment having a first shroud wall that extends circumferentially partway around the central axis and a first attachment feature that extends radially outward from the first shroud wall, wherein the first shroud wall has a first radial outer surface and a first radial inner surface, a second shroud segment arranged circumferentially adjacent the first shroud segment about the central axis, the second shroud segment including a second carrier segment arranged circumferentially at least partway around the central axis and a second blade track segment supported by the second carrier segment to define a second portion of the gas path of the turbine shroud assembly, the second blade track segment having a second shroud wall that extends circumferentially partway around the central axis and a second attachment feature that extends radially outward from the second shroud wall, wherein the second shroud wall has a second radial outer surface and a second radial inner surface, and a seal assembly configured to block gases from escaping the gas path radially between the first shroud segment and the second shroud segment, the seal assembly including a strip seal and a damping coil, the strip seal having an axial segment that extends axially along the first radial outer surface of the first shroud wall and the second radial outer surface of the second shroud wall to block the gases from passing radially between and beyond the first shroud wall and the second shroud wall, and the damping coil arranged axially along the axial segment of the strip seal to apply a radial inward force to the axial segment of the strip seal so that the strip seal is urged radially inwardly to maintain engagement of the strip seal with the first shroud wall and the second shroud wall while allowing for radial misalignment of the first blade track segment relative to the second blade track segment during use of the turbine shroud assembly.

2. The turbine shroud assembly of claim 1, wherein the first carrier segment and the second carrier segment cooperate to define a coil-receiving space that opens radially inwardly and receives the damping coil therein.

3. The turbine shroud assembly of claim 1, wherein the first carrier segment includes a first outer wall, a first flange that extends radially inward from the first outer wall, a second flange axially spaced apart from the first flange and extending radially inward from the first outer wall, a third flange that extends radially inward from the first outer wall and is located axially between the first flange and the second flange, and a fourth flange that extends radially inward from the first outer wall and is located axially between the third flange and the second flange, and wherein the damping coil is located axially between the first flange of the first carrier segment and the third flange of the first carrier segment.

4. The turbine shroud assembly of claim 3, wherein the first carrier segment includes a radial inner surface that extends axially between the first flange of the first carrier segment and the third flange of the first carrier segment, and wherein the damping coil is located radially between the radial inner surface of the first carrier segment and the axial segment of the strip seal to engage each of the radial inner surface of the first carrier segment and the axial segment of the strip seal.

5. The turbine shroud assembly of claim 1, wherein the axial segment of the strip seal extends between a first end and second end thereof opposite the first end, and wherein the strip seal includes a forward radial segment that extends axially forward and radially outward from the first end of the axial segment into the first carrier segment and an aft radial segment that extends axially aft and radially outward from the second end of the axial segment.

6. The turbine shroud assembly of claim 5, wherein the first carrier segment includes a first outer wall, a first flange that extends radially inward from the first outer wall, a second flange axially spaced apart from the first flange and extending radially inward from the first outer wall, a third flange that extends radially inward from the first outer wall and is located axially between the first flange and the second flange, and a fourth flange that extends radially inward from the first outer wall and is located axially between the third flange and the second flange, and wherein the forward radial segment of the strip seal extends into the first flange of the first carrier segment, the aft radial segment of the strip seal is located axially aft of the second flange of the first carrier segment, and the damping coil is located axially between the first flange of the first carrier segment and the third flange of the first carrier segment.

7. The turbine shroud assembly of claim 5, wherein the forward radial segment of the strip seal extends axially forward and radially outward from the first end of the axial segment into a slot formed in the first carrier segment to axially locate the strip seal relative to the first carrier segment.

8. The turbine shroud assembly of claim 7, wherein the forward radial segment includes a first portion that extends along a curved path axially forward and radially outward from the first end of the axial segment and a second portion that extends radially outward from the first portion along a straight path.

9. The turbine shroud assembly of claim 5, wherein the aft radial segment of the strip seal is located axially aft of the first carrier segment and engages an aft wall of the first carrier segment to axially locate the strip seal relative to the first carrier segment.

10. The turbine shroud assembly of claim 9, wherein the aft radial segment includes a first portion that extends along a curved path axially aft and radially outward from the second end of the axial segment and a second portion that extends radially outward from the first portion along a straight path.

11. The turbine shroud assembly of claim 1, wherein the first attachment feature of the first blade track segment includes a first attachment flange that extends radially outward from the first shroud wall and a second attachment flange that extends radially outward from the first shroud wall and axially spaced apart from the first attachment flange, and wherein the second attachment feature of the second blade track segment includes a third attachment flange that extends radially outward from the second shroud wall and a fourth attachment flange that extends radially outward from the second shroud wall and axially spaced apart from the third attachment flange, and wherein the damping coil is located circumferentially between the first attachment flange of the first blade track segment and the third attachment flange of the second blade track segment.

12. A turbine shroud assembly for use with a gas turbine engine, the turbine shroud assembly comprising:

a first shroud segment including a first carrier segment arranged circumferentially at least partway around a central axis and a first blade track segment supported by the first carrier segment to define a first portion of a gas path of the turbine shroud assembly, the first blade track segment having a first shroud wall that extends circumferentially partway around the central axis and a first attachment feature that extends radially outward from the first shroud wall, a second shroud segment arranged circumferentially adjacent the first shroud segment about the central axis, the second shroud segment including a second carrier segment arranged circumferentially at least partway around the central axis and a second blade track segment supported by the second carrier segment to define a second portion of the gas path of the turbine shroud assembly, the second blade track segment having a second shroud wall that extends circumferentially partway around the central axis and a second attachment feature that extends radially outward from the second shroud wall, and a seal assembly configured to block gases from escaping the gas path radially between the first shroud segment and the second shroud segment, the seal assembly including a strip seal and a damping coil, the strip seal extending axially along the first shroud wall and the second shroud wall, and the damping coil arranged along the strip seal to apply a radial inward force to the strip seal so that the strip seal is urged radially inwardly to maintain engagement of the strip seal with the first shroud wall and the second shroud wall.

13. The turbine shroud assembly of claim 12, wherein the first carrier segment includes a first outer wall, a first flange that extends radially inward from the first outer wall, a second flange axially spaced apart from the first flange and extending radially inward from the first outer wall, a third flange that extends radially inward from the first outer wall and is located axially between the first flange and the second flange, and a fourth flange that extends radially inward from the first outer wall and is located axially between the third flange and the second flange, and wherein the damping coil is located axially between the first flange of the first carrier segment and the third flange of the first carrier segment.

14. The turbine shroud assembly of claim 13, wherein the first carrier segment includes a radial inner surface that extends axially between the first flange of the first carrier segment and the third flange of the first carrier segment, and wherein the damping coil is located radially between the radial inner surface of the first carrier segment and the strip seal to engage each of the radial inner surface of the first carrier segment and the strip seal.

15. The turbine shroud assembly of claim 13, wherein the strip seal includes an axial segment that extends axially along the first shroud wall and the second shroud wall between a first end and a second end thereof opposite the first end, a forward radial segment that extends axially forward and radially outward from the first end of the axial segment into the first flange of the first carrier segment, and an aft radial segment that extends axially aft and radially outward from the second end of the axial segment, and wherein the aft radial segment of the strip seal is located axially aft of the second flange of the first carrier segment.

16. The turbine shroud assembly of claim 15, wherein the damping coil extends axially along the axial segment of the strip seal to apply the radial inward force to the axial segment of the strip seal so that the axial segment of the strip seal engages each of the first shroud wall and the second shroud wall.

17. The turbine shroud assembly of claim 12, wherein the first attachment feature of the first blade track segment includes a first attachment flange that extends radially outward from the first shroud wall and a second attachment flange that extends radially outward from the first shroud wall and axially spaced apart from the first attachment flange, and wherein the second attachment feature of the second blade track segment includes a third attachment flange that extends radially outward from the second shroud wall and a fourth attachment flange that extends radially outward from the second shroud wall and axially spaced apart from the third attachment flange, and wherein the damping coil is located circumferentially between the first attachment flange of the first blade track segment and the third attachment flange of the second blade track segment.

18. A method of assembling a turbine shroud assembly for use with a gas turbine engine comprising:

assembling a first shroud segment by coupling a first blade track segment with a first carrier segment to support the first blade track segment radially inward of the first carrier segment, assembling a second shroud segment by coupling a second blade track segment with a second carrier segment to support the second blade track segment radially inward of the second carrier segment, locating a strip seal on a first radial outer surface of the first blade track segment and a second radial outer surface of the second blade track segment, locating a damping coil radially between the first carrier segment and the strip seal so that the damping coil engages the first carrier segment and the strip seal, and applying a radial inward force to the strip seal with the damping coil to maintain engagement of the strip seal with the first radial outer surface of the first blade track segment and the second radial outer surface of the second blade track segment in response to radial misalignment of the first blade track segment relative to the second blade track segment.

19. The method of claim 18, wherein the step of applying a radial inward force includes applying the radial inward force along a centerline of the strip seal located between circumferential ends of the strip seal.

20. The method of claim 18, wherein the step of locating a strip seal includes locating a forward radial segment of the strip seal in a slot formed in a first flange of the first carrier segment and locating an aft radial segment of the strip seal axially aft of the first carrier segment.

* * * * *